United States Patent [19]

Shitanoki

[11] Patent Number: 4,789,342
[45] Date of Patent: Dec. 6, 1988

[54] NEUTRAL POSITION INDICATOR FOR ELECTRICALLY CONDUCTIVE CABLE IN STEERING WHEEL

[75] Inventor: Kazuaki Shitanoki, Saitama, Japan

[73] Assignee: Honda Giken Kogyo Kabushiki Kaisha, Tokyo, Japan

[21] Appl. No.: 35,603

[22] Filed: Apr. 7, 1987

[30] Foreign Application Priority Data

Apr. 7, 1986 [JP] Japan ................................. 61-79563

[51] Int. Cl.⁴ .............................................. H01R 3/00
[52] U.S. Cl. ..................................... 439/15; 439/169; 439/491
[58] Field of Search ...................... 439/13, 15, 39, 162, 439/169

[56] References Cited

U.S. PATENT DOCUMENTS 4,417,775 11/1983 Sakurai et al. .................... 439/15 X
4,422,699 12/1983 Sakurai et al. .......................... 439/15
4,540,223 9/1985 Schmerda et al. .................... 439/15

FOREIGN PATENT DOCUMENTS 3041258 6/1982 Fed. Rep. of Germany ........ 439/15

Primary Examiner—Eugene F. Desmond
Attorney, Agent, or Firm—Lyon & Lyon

[57] ABSTRACT

A neutral position indicator for an electrically conductive cable coiled in an automotive steering wheel includes a fixed storage case for storing the electrically conductive cable therein, the storage case including a rotatable member rotatable with the steering wheel, and a position indicator unit rotatably mounted in the fixed storage case and angularly movable for a first angular interval each time the rotatable member rotates through a second angular interval in response to completion of the rotation of the rotatable member through the second angular interval, the position indicator unit being indicative of a neutral position of the electrically conductive cable when the position indicator unit reaches a prescribed angular position. The storage case is covered with a cover having a window for allowing visual observation of the position indicator unit. The angular position of the rotatable member, i.e., the electrically conductive cable coiled in the storage case, can be indicated by the position indicator unit since the position indicator unit is angularly moved through the first angular extent each time the rotatable member rotates through the second angular extent. The neutral position of the cable can easily be confirmed by visually checking the angular position of the position indicator unit through the window.

4 Claims, 4 Drawing Sheets

NEUTRAL POSITION INDICATOR FOR ELECTRICALLY CONDUCTIVE CABLE IN STEERING WHEEL

BACKGROUND OF THE INVENTION

1. Field of the Invention

The present invention relates to a neutral position indicator for indicating a neutral position of an electrically conductive cable coiled in the steering wheel in an automobile.

2. Description of the Relevant Art

Steering wheels in modern automobiles incorporate therein various electric circuit components such as a horn switch or an electric device such as a safety air bag system. Such automobiles are required to have a connector which keeps the circuit components or electric device on the steering wheel in electric contact with an electric circuit on a stationary component such as a steering column in the automobile body. One example of such a connector is a mechanical slip ring mechanism including slidable electric contacts which are held in sliding contact with each other to provide desired electric connection between the electric circuits desired to be electrically coupled. The slidable electric contacts are however poor in reliability as they are vulnerable to dust, water, or vibration.

U.S. Pat. No. 4,451,105 discloses an electrical connector device providing direct electric connection between relatively movable members in an automobile. In the disclosed device, a flat cable has one end connected to a steering wheel and the other end connected to a stationary member in the automobile body, the flat cable being wound around a steering shaft. The flat cable electrically interconnects an electric component in the steering wheel and an electric circuit in the automobile body. Since the flat cable provides stable electric contact between the desired electric circuits, it is highly reliable in operation.

The flat cable is required to be neutrally positioned in its coiled form when the steering wheel is in its neutral position, so that the flat cable can be wound and unwound in equal angular extents without being unduly pulled or tensioned at the time the steering wheel makes a few turns in opposite directions through a maximum steering angle. When assembling the steering wheel or reassembling the steering wheel after it has been repaired, therefore, it is necessary to indicate a neutral position for the flat cable so that the worker can easily set the flat cable in the neutral position in its coiled form. The disclosed electrical connector device has an arrangement for indicating the neutral position for the flat cable.

A similar neutral position indicator for a flat cable in a steering wheel is disclosed in U.S. Pat. No. 4,422,699.

SUMMARY OF THE INVENTION

In view of the aforesaid problem of the conventional neutral position indicator, it is an object of the present invention to provide a neutral position indicator which is simple in construction and easily visually observable for indicating a neutral position of an electrically conductive cable in a coiled form.

According to the present invention, there is provided a neutral position indicator for an electrically conductive cable coiled in an automotive steering wheel, comprising a fixed storage case for storing the electrically conductive cable therein, the storage case including a rotatable member rotatable with the steering wheel, a position indicator unit rotatably mounted in the fixed storage case and angularly movable for a first angular interval each time the rotatable member rotates through a second angular interval in response to completion of the rotation of the rotatable member through the second angular interval, the position indicator unit being indicative of a neutral position of the electrically conductive cable when the position indicator unit reaches a prescribed angular position, a cover disposed in covering relation to the storage case, and a window defined in the cover for allowing visual observation of the position indicator unit.

The angular position of the rotatable member, i.e., the electrically conductive cable coiled in the storage case, can be indicated by the position indicator unit since the position indicator unit is angularly moved through the first angular extent each time the rotatable member rotates through the second angular extent in response to completion of the rotation of the rotatable member through the second angular extent. The neutral position of the cable can easily be confirmed by visually checking the angular position of the position indicator unit through the window.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 6($b$) is an enlarged fragmentary cross-sectional view of the neutral position indicator;

DETAILED DESCRIPTION OF THE PREFERRED EMBODIMENT

Figure 1:
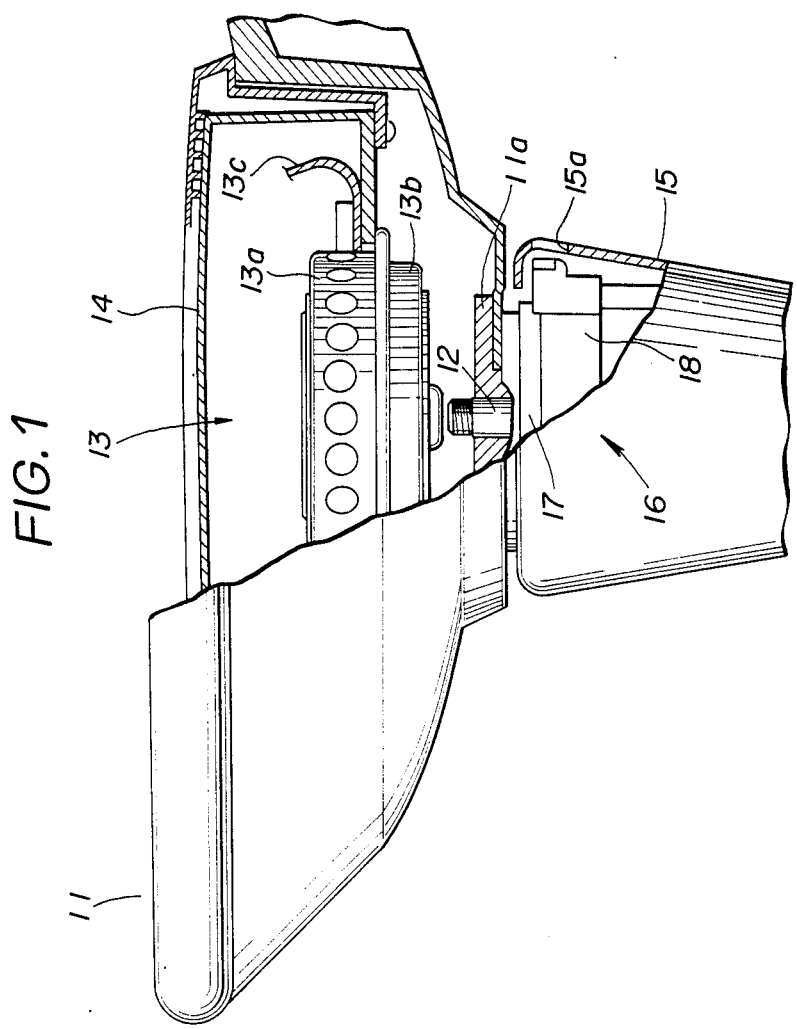
FIG. 1 is a fragmentary cross-sectional view of a steering wheel incorporating a neutral position indicator according to the present invention.

As shown in FIG. 1, a steering wheel 11 has a boss 11a coupled by splines, for example, to the upper end of a steering shaft 12 which is connected to a steering gear mechanism (not shown) for steering automobile wheels (not shown). The steering wheel 11 incorporates therein a safety air bag system 13 disposed in a central recess of the steering wheel 11 and enclosed in a pad 14, the safety air bag system 13 being actuatable for dampening shocks upon collision. The safety air bag system 13 comprises a gas generator 13a, an actuator 13b for actuating the gas generator 13a, and an inflatable air bag 13c. The safety air bag system 13 may be of a known structure such as disclosed in Japanese Laid-Open Patent Publication No. 53-109342, for example.

Figure 3:
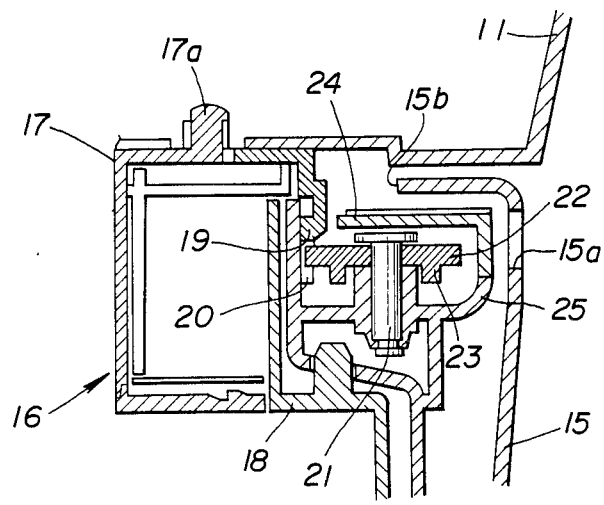
FIG. 3 is a cross-sectional view taken along line III—III of FIG. 2.
Figure 5:
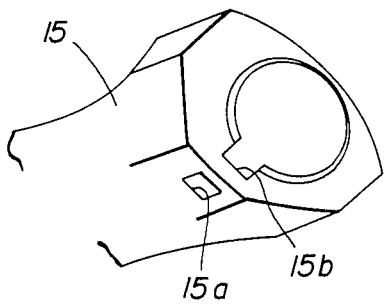
FIG. 5 is a perspective view of a column cover.

A storage case 16 disposed coaxially around the steering shaft 12 houses therein an electric signal transmission mechanism (described later on) enclosed in a column cover 15. As shown in FIGS. 3 and 5, the column cover 15 has two spaced windows 15a, 15b for visually checking markings on a position indicator gear (described later on).

Figure 4:
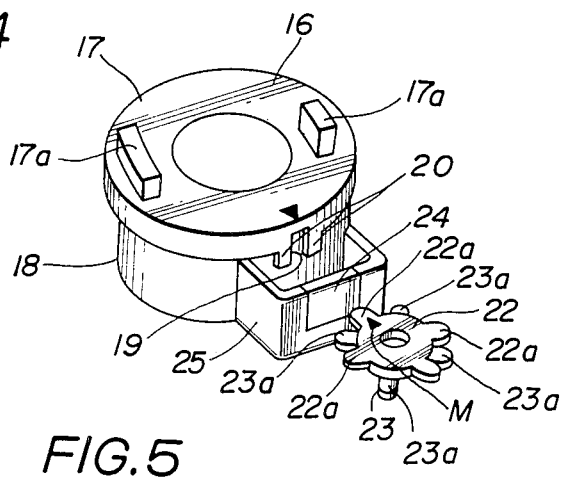
FIG. 4 is a perspective view of the neutral position indicator.

As shown in FIGS. 3 and 4, the storage case 16 comprises a rotatable casing 17 having teeth 17a disposed in respective holes defined in the steering wheel 11 and rotatable with the steering wheel 11, and a fixed casing 18 securely attached to a stationary member such as the column cover 15 in the automobile body. The electric signal transmission mechanism is in the form of a flat cable coiled in the storage case 16 and has one end connected to the rotatable casing 17 and the other end to the fixed casing 18.

Figure 6A:
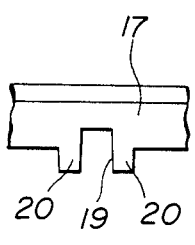
FIG. 6($a$) is an enlarged fragmentary front elevational view of a rotatable casing.
Figure 6B:
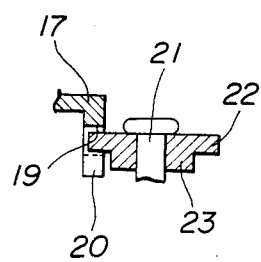

As illustrated in FIGS. 4, 6(a) and 6(b), the rotatable casing 17 has a recess 19 defined in a lower edge of an outer circumferential wall and opening downwardly, and a pair of circumferentially spaced engaging fingers 20 directed downwardly and positioned one on each side of the recess 19.

Figure 2:
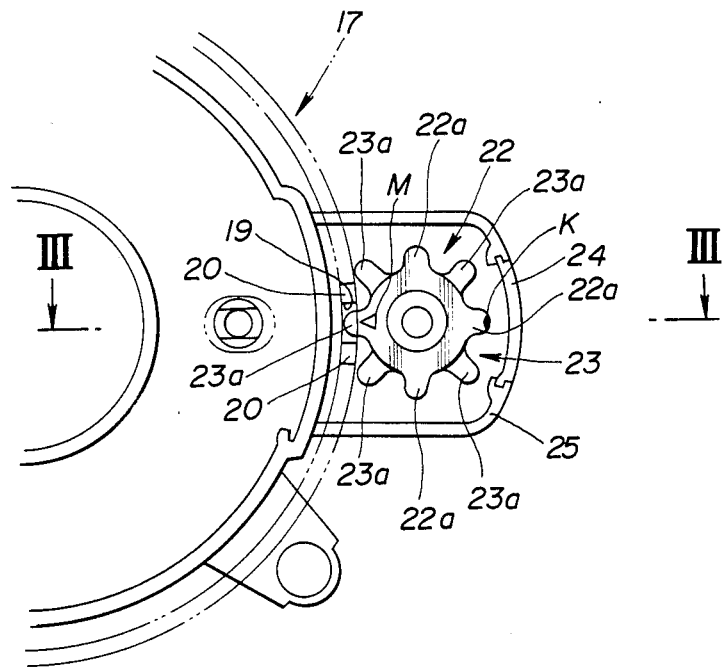
FIG. 2 is a fragmentary plan view of the neutral position indicator.
Figure 7:
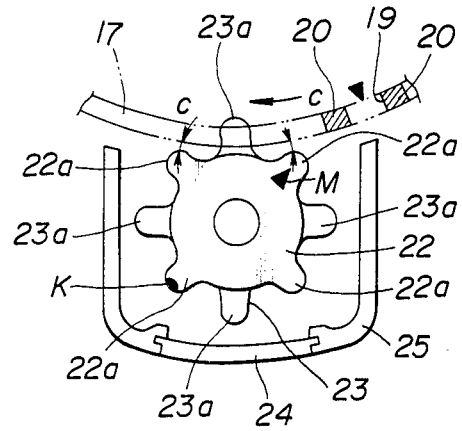
FIGS. 7($a$) through 7($e$) are fragmentary plan views showing operation of the neutral position indicator.
Figure 7:
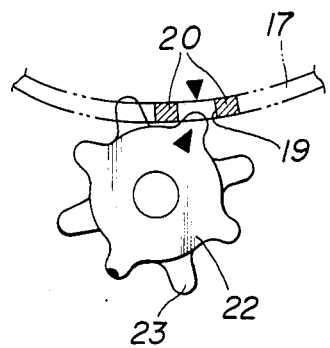
Figure 7:
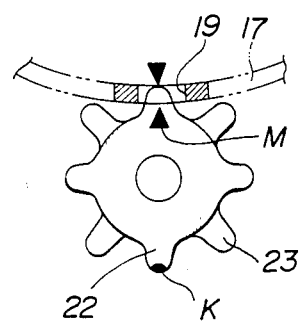
Figure 7:
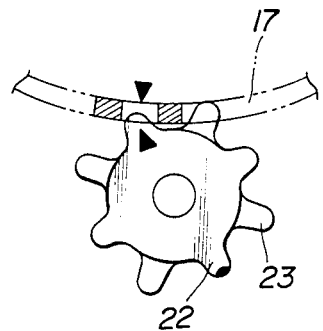
Figure 7:
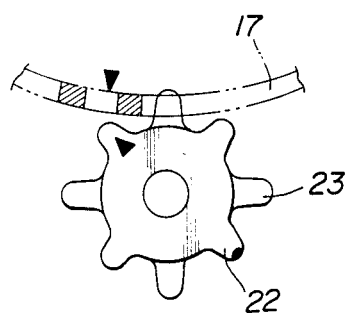

A rotatable shaft 21 is disposed in the fixed casing 18 parallel to the steering shaft 12 (FIG. 1) and supported on a bracket 25 of the fixed casing 18, the shaft 21 being positioned radially outwardly of the rotatable casing 17. A unitary gear unit comprising an upper position indicator gear 22 and a lower position indicator gear 23 is rotatably supported on the rotatable shaft 21, the gears 22, 23 being coaxial with each other. As shown in FIG. 2, the upper position indicator gear 22 is located more closely to the steering wheel 11 and has four teeth 22a projecting radially outwardly and circumferentially spaced at equal angular intervals or pitches of 90°, the teeth 22a being engageable one at a time in the recess 19 of the rotatable casing 17. The lower position indicator gear 23 also has four teeth 23a projecting radially outwardly and circumferentially spaced at equal angular intervals or pitches of 90°, the teeth 23a being positioned below the lower peripheral edge of the outer circumferential wall of the casing 17 and engageable one at a time with one of the fingers 20. The teeth 23a are angularly spaced from the teeth 22a by equal pitches of 45°. When one of the teeth 23a of the lower position indicator gear 23 is directed toward the central axis of the steering shaft 12 as shown in FIG. 7(a), the teeth 22a of the upper position indicator gear 22, closer to the rotatable casing 17, are spaced from the outer peripheral surface of the casing 17 by a small gap c so as to allow free rotation of the casing 17. A marking M for indicating the neutral position of the electrically conductive cable in the coiled form is applied to the upper surface of the upper position indicator gear 22 on one of the gear teeth 22a thereof, and another marking K is applied to the tooth 22a which is diametrically opposite to the marked tooth 22a. The upper and lower position indicator gears 22, 23 are covered with a transparent cover 24 made of acrylic resin, for example, so that the markings M, K can visually be observed through the transparent cover 24 from the inspection windows 15a, 15b.

Operation of the neutral position indicator thus constructed is as follows:

The position indicator gears 22, 23 are rotated one pitch, i.e., one tooth-to-tooth angular spacing, each time the casing 17 and hence the steering wheel 11 make one revolution. When the position indicator gears 22, 23 are positioned as shown in FIG. 7(a) with respect to the casing 17, i.e., when one of the gear teeth 23a of the lower position indicator gear 23 is oriented toward the central axis of the casing 17, the teeth 22a of the upper position indicator gear 22 which are closer to the casing 17 are spaced a small gap c from the outer peripheral surface of the casing 17. In this position, the position indicator gears 22, 23 are prevented from freely rotating since the teeth 22a would interfere with the outer peripheral surface of the casing 17.

When the casing 17 is rotated about its own axis clockwise in the direction of the arrow in FIG. 7(a), the lefthand one of the fingers 20 of the casing 17 pushes one of the teeth 23a of the lower position indicator gear 23 to turn the position indicator gears 22, 23, as shown in FIG. 7(b). The tooth 22a marked with the marking M then fits into the recess 19 of the casing 17, as illustrated in FIG. 7(c). The position of FIG. 7(c) is selected to coincide with the neutral position of the electrically conductive cable in the coiled form. Further rotation of the casing 17 causes the other finger 20 to push the marked tooth 22a in the recess 19, thus turning the position indicator gears 22, 23, as shown in FIG. 7(d). When the marked tooth 22a is completely displaced out of the recess 19, as shown in FIG. 7(e), the position indicator gears 22, 23 are prevented again from free rotation as in the condition shown in FIG. 7(a). Further one revolution of the casing 17 brings the parts to the position of FIG. 7(a), except that the marked tooth 22a is in a different angular position at this time.

As described above, the position indicator gears 22, 23 are angularly moved one pitch each time the casing 17 or the steering wheel 11 makes one revolution, and are indicative of how many times the steering wheel 11 is turned, and hence of the neutral position of the cable in the storage case 16. The angular position of the position indicator gears 22, 23 can visually be observed through the inspection windows 15a, 15b during assembly of the steering wheel 11, and also can visually be checked through the window 15b after the steering assembly 11 has been assembled. Therefore, the neutral position of the cable in the storage case 16 can easily be confirmed.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A neutral position indicator for an electrically conductive cable coiled in an automotive steering wheel, comprising:

a fixed storage case for storing the electrically conductive cable therein, said storage case including a rotatable member rotatable with the steering wheel;

a position indicator unit rotatably mounted in said fixed storage case and angularly movable for a first angular interval each time said rotatable member rotates through a second angular interval in response to completion of the rotation of said rotatable member through said second angular interval, said position indicator unit being indicative of a neutral position of the electrically conductive cable when the position indicator unit reaches a prescribed angular position;

a cover disposed in covering relation to said storage case; and a window defined in said cover for allowing visual observation of said position indicator unit.

2. A neutral position indicator according to claim 1, wherein said rotatable member includes a circumferential wall having a recess, said position indicator unit including a first gear having a plurality of equally angularly spaced first teeth engageable one at a time in said recess, one of said teeth bearing a marking thereon.

3. A neutral position indicator according to claim 2, wherein said rotatable member has a pair of circumferentially spaced fingers projecting from said circumferential wall and disposed one on each side of said recess, said position indicator unit further including a second gear coaxial with said first gear and having a plurality of equally angularly spaced second teeth which are angularly spaced from said first teeth, said second teeth being engageable one at a time with one of said fingers.

4. A neutral position inidicator according to claim 3, wherein the first teeth of said first gear which are closer to said rotatable member are spaced from the rotatable member when one of said second teeth is directed toward a central axis of said rotatable member, for thereby allowing rotation of said rotatable member.

* * * * *